United States Patent
Nourbakhsh (10) Patent No.: US 8,957,943 B2
(45) Date of Patent: Feb. 17, 2015

(54) GAZE DIRECTION ADJUSTMENT FOR VIDEO CALLS AND MEETINGS

(75) Inventor: Farhad Nourbakhsh, Apple Valley, MN (US)

(73) Assignee: BBY Solutions, Inc., Richfield, MN (US)

( * ) Notice: Subject to any disclaimer, the term of this patent is extended or adjusted under 35 U.S.C. 154(b) by 221 days.

(21) Appl. No.: 13/539,530

(22) Filed: Jul. 2, 2012

(65) Prior Publication Data
US 2014/0002586 A1 Jan. 2, 2014

(51) Int. Cl.
*H04N 7/14* (2006.01)

(52) U.S. Cl.
USPC ..................................... 348/14.16; 348/14.12

(58) Field of Classification Search
USPC ........... 348/14.01, 14.02, 14.16, 14.08, 14.12
See application file for complete search history.

(56) References Cited

U.S. PATENT DOCUMENTS

| | | | |
|---|---|---|---|
| 2008/0278516 A1* | 11/2008 | Santon | 345/619 |
| 2011/0249136 A1* | 10/2011 | Levy et al. | 348/222.1 |
| 2012/0274735 A1* | 11/2012 | Byers | 348/14.16 |
| 2013/0070046 A1* | 3/2013 | Wolf et al. | 348/14.16 |

* cited by examiner

*Primary Examiner* — Olisa Anwah
(74) *Attorney, Agent, or Firm* — Beck & Tysver PLLC (57) ABSTRACT

In a typical video meeting, each of two persons has a computer or a portable electronic device, controlled by one or more processors executing software instructions. Each device has a screen and a video camera. Typically, B's camera will be positioned above B's screen. Video of B is transmitted across a communication system from B's camera to A's screen. Because B is looking at A's image on the screen, A will perceive B to be focused downward, not making eye contact. The present invention analyzes video frames for the orientations of B's head and focus, and uses image editing software tools to virtually correct the gaze direction of B's eye to be directed toward B's camera. A's gaze direction may be similarly adjusted simultaneously. The approach may also be used with 3 or more participants, e.g., in a video conference.

2 Claims, 6 Drawing Sheets

GAZE DIRECTION ADJUSTMENT FOR VIDEO CALLS AND MEETINGS

FIELD OF THE INVENTION

The present invention relates to technology for video calls and meetings. More specifically, it relates to automatically adjusting eye gaze direction in a set of images to simulate eye-contact.

SUMMARY OF THE INVENTION

In a typical video meeting or phone conversation, each of two persons has a computer or a portable electronic device, controlled by one or more processors executing software instructions. Each device has a screen and a video camera. Typically, B's camera will be positioned above B's screen. Video of B is transmitted across a communication system from B's camera to A's screen. Because B is looking at A's image on the screen, A will perceive B to be gazing downward, not making eye contact. The present invention analyzes video frames for the orientations of B's head and gaze direction, and uses image editing software to virtually correct the gaze direction of B's eye upward, toward B's camera.

By "gaze direction" we mean the direction in which a person, or a camera is viewing. The gaze may be directed toward an area or a point.

Within a given video frame, any aspect of the eye or surrounding tissue and hair might be measured. Parameters may include location, orientation, size, and coloring, in an absolute sense or in relation to other features. The software might determine, for example, such parameters for the visible portion of the sclera (or "white" of the eye); the iris; the eyelid, eyebrows; and eyelashes. In particular, software tools, may be used to determine the exact location of a speaker's pupil. Software tools may be used to adjust the geometry of the eye itself, and possibly also the geometries of neighboring features. For example, the pupil may be moved toward the center of the eye. They eye opening may be enlarged, to offset the apparent reduction in size when a person is looking downward.

Of course, if the camera is located relative to the screen other than above it, then the necessary corrections must take that into account. The location of the camera may be a static feature of the device. For example, a cell phone or a laptop computer may have a built-in camera. The software may be aware of that fixed location in any number of ways known to software programmers. For example, the location might be "hard-coded" in the software, or obtained from a database. The database might be local or remote. For example, the software might determine what device it is running on from built-in parameters, and refer over a network to a remote database for such data as camera location and screen geometry.

The video camera may be external to the computer or portable electronic device. This might be because the device does not have a built-in camera, or because an external camera of better quality may be available as an alternative. Determining the camera position might be done as a system calibration exercise. For example, software, provided to the user through a user interface, might instruct the user to look directly at screen(/camera) and then at the camera(/screen). Such calibration allows the amount of correction of gaze direction required for the specific geometry to be calculated.

Alternatively, the software might simply measure, over some time interval, how the geometry of the user's eyes compares with the geometry they would have if they were directed toward the camera. From such measurement, the position of the camera might be inferred.

Software suitable for some aspects of functionality of the invention already exist. For example, "red-eye" software can locate the exact location of the pupil. Once the eye has been located, various tools, such as ones available in PHOTOSHOP® and similar image processing software, can be used to redirect the eye toward an image of a face, from looking down to looking forward. For example, various techniques may use the liquify, pucker, bloat, push, lasso, mask, and layer tools of PHOTOSHOP®.

DETAILED DESCRIPTION OF EXEMPLARY EMBODIMENTS

This description provides embodiments of the invention intended as exemplary applications. The reader of ordinary skill in the art will realize that the invention has broader scope than the particular examples described here.

Figure 1:
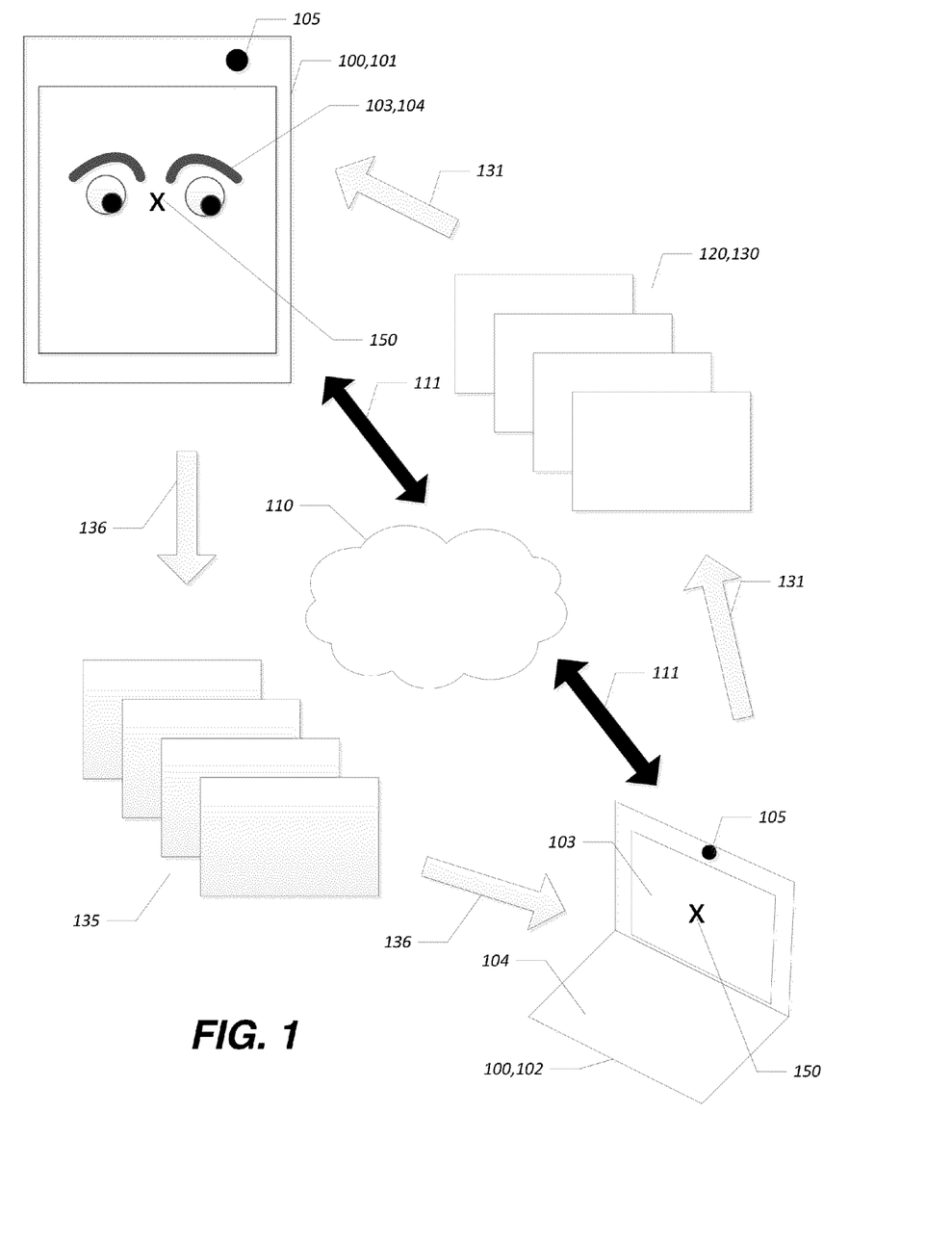
FIG. 1 is a conceptual diagram illustrating a system implementing eye position correction in a video stream.

FIG. 1 illustrates a context in which eye position correction might be used. Two people (not shown) are engaged in a video call or video chat, each person using a video capable device 100 for this purpose. A VCD 100 is a device having, as a minimum, some kind of camera 105, such as a video camera 105, whereby images of the person using that device may be transmitted to the other person. In this case, one VCD 100 is a laptop computer 102, and the other is a portable electronic device 101, such as a cell phone or portable music player. The VCD 100 might also include the capability to receive and transmit audio information.

There are not necessarily just two VCDs 100 upon which eye focus correction is implemented. There may be many, such as in a video conferencing or distance learning context. There might be only one since all that is required is correction of a single set of images. Indeed, the concept of eye focus correction may be implemented with a sequence of images, without a VCD 100 being directly involved at all. There may be a sequence of video images, captured by a VCD 100 in "near real time" (NRT), a still image, or a collection of still images.

By NRT, we mean that most of the images transferred by a VCD 100 without significant delay that would be perceptible to a human being. If the video call also includes audio transmission, then the transferred audio and video streams will be reasonably synchronized.

In the embodiment shown in FIG. 1, the VCDs 100 communicate with each other over some communication system 110 that is external to the devices. As suggested by the black arrows 111, the information flow may be in both directions, although unidirectional flow is also possible.

Throughout this document, by "communication system" we mean any system capable of transmitting or receiving information in electronic digital form. A communication system may be wired or wireless. It may involve a network, such as a wide-area network like the Internet, a local-area network, or a personal-area network. It may employ any technology, such as Wi-Fi, cellular, or BLUETOOTH®. It may be internal to a device, like a computer bus. It may employ any protocol for representing information. A communication system may employ any combination of these or similar technologies.

By "logic" we mean a sequence of steps implemented in some combination of hardware, and/or software instructions accessed from a tangible storage medium. By a "tangible storage medium" we mean any device capable of temporarily or permanently storing or retaining information, including, for example, computer memory, rotational medium or optical disk, flash memory, or pen drives.

A VCD 100 may have a user interface 104, capable of receiving information from a user and providing information to the user. For example, VCD 100 might have a touch screen with various controls, it might have some hardware controls such as a keyboard, or voice controls. The user interface 104 may allow the user to initiate and engage in activities such as a video call or video conference.

In the embodiment shown, images are transferred in both directions during a video call. From the perspective of the portable electronic device 101, for example, a set of images 120 is being transmitted from the computer 102 and received by the portable electronic device 101, in the direction indicated by arrows 131. A set of output images 135 is being transmitted from the portable electronic device 101 and received by the computer 102, in the direction indicated by arrows 136.

Figure 2:
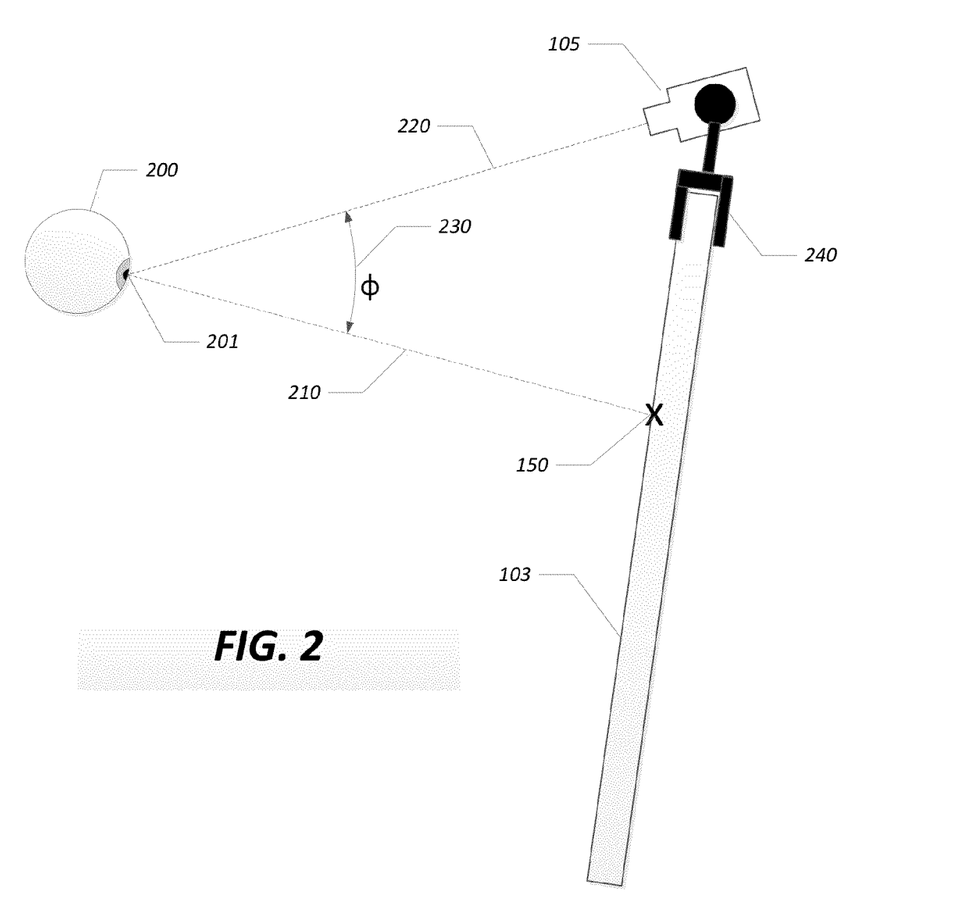
FIG. 2 is a conceptual side view illustrating an angle between a gaze direction of a person engaged in a video call, and the gaze direction of a video camera.

FIG. 2 is a conceptual side view illustrating an eye 200 of a person R (i.e., receiving person) looking at NRT images of another person T (transmitting person), with whom R is engaged in a video call, on a screen 103 of a VCD 100. Ordinarily, but not necessarily, T will be receiving from R as well as transmitting to R. It is efficient, however, to consider a process from a one-sided perspective, then exploit of symmetry. At the particular instant depicted by the figure, the line of sight 210 of T's pupil 201 is directed toward a focal point 150 somewhere below the top of the screen 103, possibly at the instantaneous location of R's eyes within the images 120.

The two video cameras 105 in FIG. 1 were internal to their respective VCDs 100. The video camera 105 of FIG. 2, in contrast, is external to the VCD 100 illustrated. It is significant that eye focus correction may be performed for external video cameras 105, although more information may need to be acquired about the position and properties of the video camera 105 in such configurations. In the figure, the video camera 105 is attached with some kind of clamp 240. The inventive concepts apply irrespective of whether the video camera 105 is internal, external attached, or external unattached.

The focus of the illustrated video camera 105 is directed in the vertical toward the level of T's eye 200. When viewed from the side as in the figure, a pair of rays directed from the pupil 201, respectively, to the video camera 105 and to the focal point 150 form a vertical angle 230 PHI. T appears to R to be looking downward rather than making eye contact with R directly.

Of course, over the course of a call, the head and body positions of T and R relative to their respective screens 103 may, and usually frequently will, change. T may look away entirely for any number of reasons, T may leave the room entirely, and so forth. In preferred embodiments, eye shifting software may take all these possibilities into account and respond appropriately.

T's focal direction may be offset relative to that of the video camera 105 in the horizontal as well as the vertical. This is illustrated conceptually in the downward view of FIG. 3. Here, a video camera 105 is depicted on top of a screen, at the far left end, and focused on camera focal point 310. The focal point 150 of T's left eye 301 and right eye 302 is, horizontally, at the center of the screen. From R's perspective, T's view will be skewed to T's right (or equivalently, R's left) by the horizontal angle 320 LAMBDA. Eye focus correction technology should take this horizontal offset into account as well.

Many modern video cameras 105 implement face- or head-tracking logic, attempting to always focus on the person's face. The above discussion of angles assumes such software. For example, a video camera 105 might be connected to a laptop computer wirelessly or by a USB port. Device driver software, installed on the laptop, may implement face tracking, attempting to keep T's face always in focus. In some implementations, T has the option whether to turn face tracking on or off. Without face tracking, the focal direction of the camera might be straight ahead. Preferably, eye-shifting software will take at both types of configuration into account.

Figure 3:
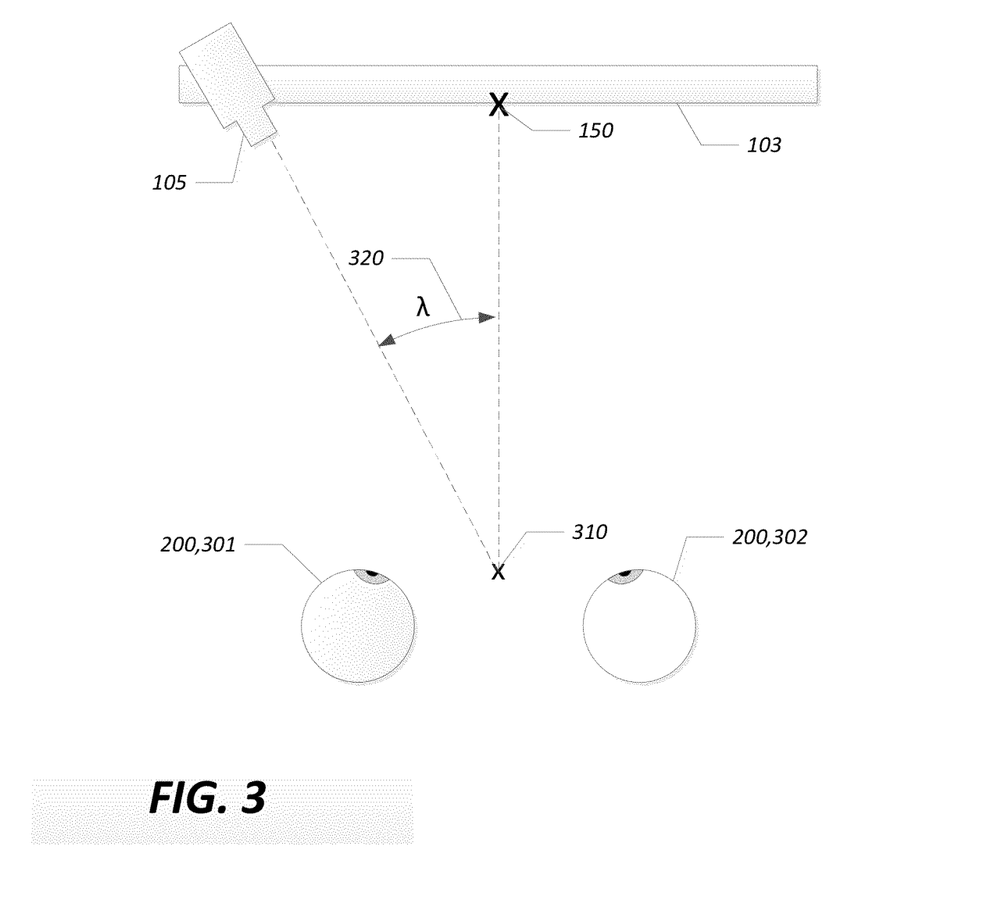
FIG. 3 is a conceptual downward view illustrating an angle between a gaze direction of a person engaged in a video call, and the gaze direction of a video camera.

Alternatively, using familiar principles of trigonometry, the vertical angle 230 PHI and the horizontal angle 320 LAMBDA can be combined into a single angle THETA, which takes both vertical and horizontal skews into account. Eye correction technology may be implemented so as to adjust for the two angles independently, or to compensate for them as a single combined angle.

Figure 4:
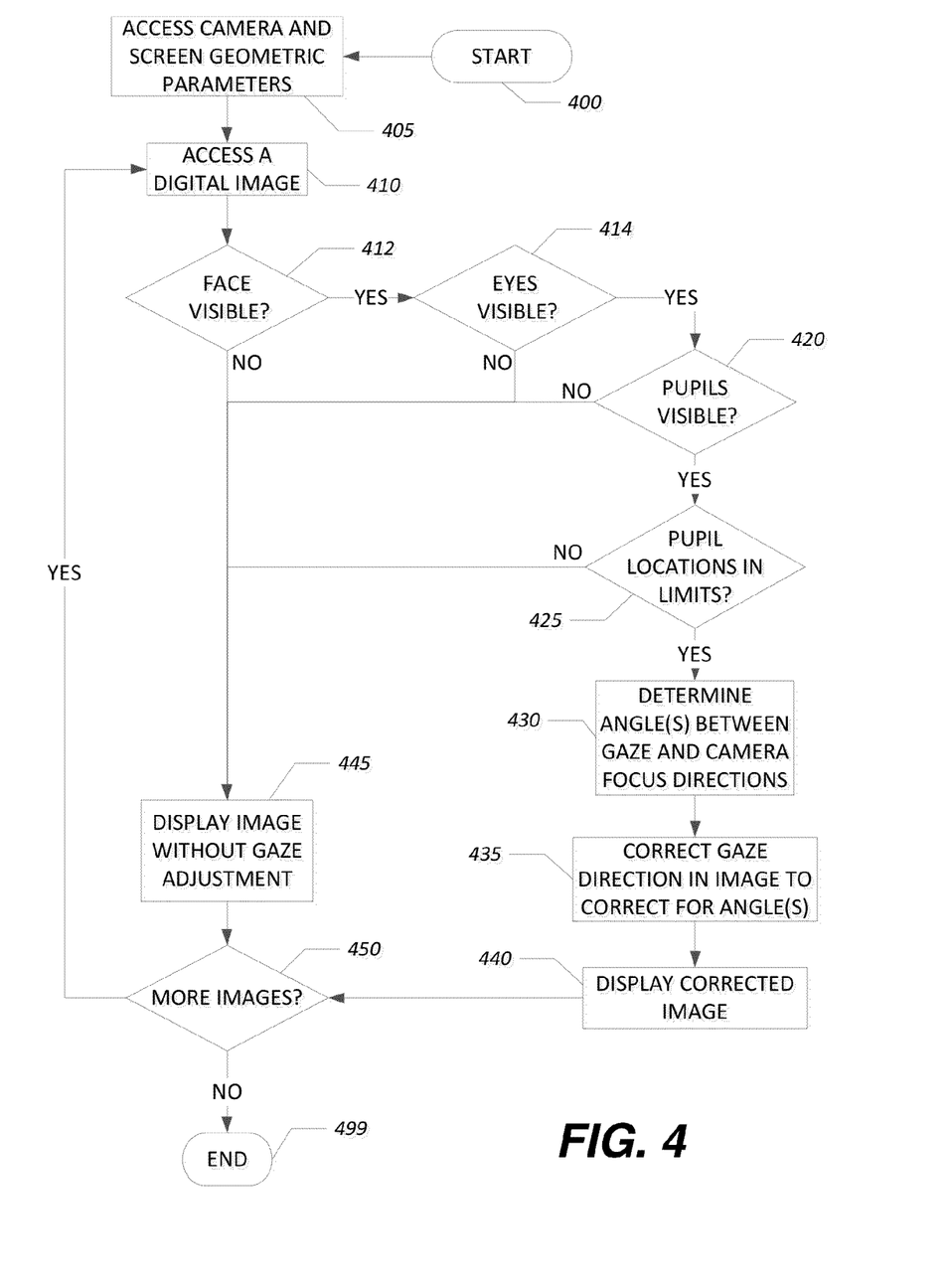
FIG. 4 is a flowchart illustrating a process that corrects gaze direction in a video stream.

FIG. 4 illustrates a process for focal point correction for a video call or meeting. After the 400, the geometry of the screen and camera of the transmitting VCD 100 are accessed 405 or ascertained 405. What information is used or needed may depend on where the eye-shifting logic is being performed. For example, such logic might be performed by logic on the VCD 100 transmitting the images 508; on the VCD 100 receiving the images 506; within the transmitting or the receiving video camera 105; or at some other location (e.g., a website or other remote facility) that can access the set of images. In the case of a video camera 105 built into the VCD 100, obtaining information about properties of a built-in video camera 105 and screen 103 might simply involve reading the information directly from storage in the device. If the make and model of the VCD 100 are known or accessible, then logic might be able to look up parameters of the video camera 105 and/or display 103. Such look up might involve use of a communication system or network.

A calibration step might be used to allow the eye-shifting logic to determine enough information about the geometry to do its work. For example, A might be fed a video of herself. By pressing some control on her device, she might be able to allow the logic to correct the images so that she is looking herself in the eye. This approach could be used, for example, even if the video camera 105 were external and somewhat arbitrarily positioned relative to the user, and had unknown properties.

In step 405, a digital image is accessed by the logic performing the eye-shifting. Again, how that access occurs depends on what device, system, or facility performs the eye-shifting. The access could be by receipt over some communication system, or retrieval from some storage. The steps 412, 414, and 420 check to see whether the subject's face, eyes, and pupils are visible. If not, then the image may be displayed 445 without correction of gaze direction. If only a single eye and pupil are visible, then a gaze adjustment may or may not be applied, depending upon embodiment. Automated red-eye correction in digital images is a technology familiar to persons having ordinary skill in the image processing arts. Pupil location and visibility may be determined by similar logic. Note that an embodiment may employ other criteria to determine whether eye-shifting is appropriate or not. For example, correction may be omitted if an eye is partially obscured. Determination of whether face, eyes, and pupils are visible also involves determination of the locations of those features, which may be stored in tangible storage.

Parameters specifying bounds for pupil locations may be specified either by the logic or in data accessed by the logic from storage. Out-of-bounds locations or directions may indicate that T is focused on something other than the images (e.g., of R) being received on T's screen 103. If, according to whichever criteria may be applied in a given embodiment, correction is determined to be warranted, then the logic is applied to adjust 435 T's gaze to be directed toward the video camera 105.

As described previously in reference to FIGS. 2 and 3, correction may be applied for either or both of vertical angle or a horizontal angle. If both, then eye-shifting may be done separately in the horizontal and vertical, or a single shift may be done for the combined angle in three-dimensions.

Eye position in the displayed images may be measured too. If it is then assumed that T is gazing at the eyes of R in the image, and if the camera gaze direction is ascertainable, then the distance of T's face from the screen may be calculated by triangulation. This calculation may be useful in making gaze direction correction.

A number of techniques have been published for manually locating an eye in a single image, and shifting the eye focus. These techniques use an image editing tools available in software programs such as PHOTOSHOP®. One technique is to "lasso" and place the eye area into a new layer, then move the image in the new layer to shift the eye focal direction. Other relevant tools may include Distort and Liquify. Of course, other software packages may use different names for similar functionality; also, the above techniques are not intended to be an exhaustive list.

Actually applying 435 the eye-shifting may be done with varying degrees of with varying degrees of sophistication. Different techniques may exploit different data about facial area including the eye. Eye-shifting might utilize automated image analysis about the geometry, coloring, and lighting of various features of a face. Relevant information on these factors that the logic might infer by analyzing the image for facial features, including, for example, some or all of the pupil, the iris, the sclera or white, the eye shape, the cuticle, the eyelashes, the eyebrows, the cuticles, the eyelids, and surrounding facial tissue and complexion. Logic embodying any technique(s) for shifting the eye focal direction might be used within the inventive concept.

If eye-shifting is performed, then the corrected image is displayed 440. After the image, either raw or corrected, is displayed, then if 450 there are more images to display, as in a video stream, then the process continues. Otherwise, it ends 499.

Figure 5:
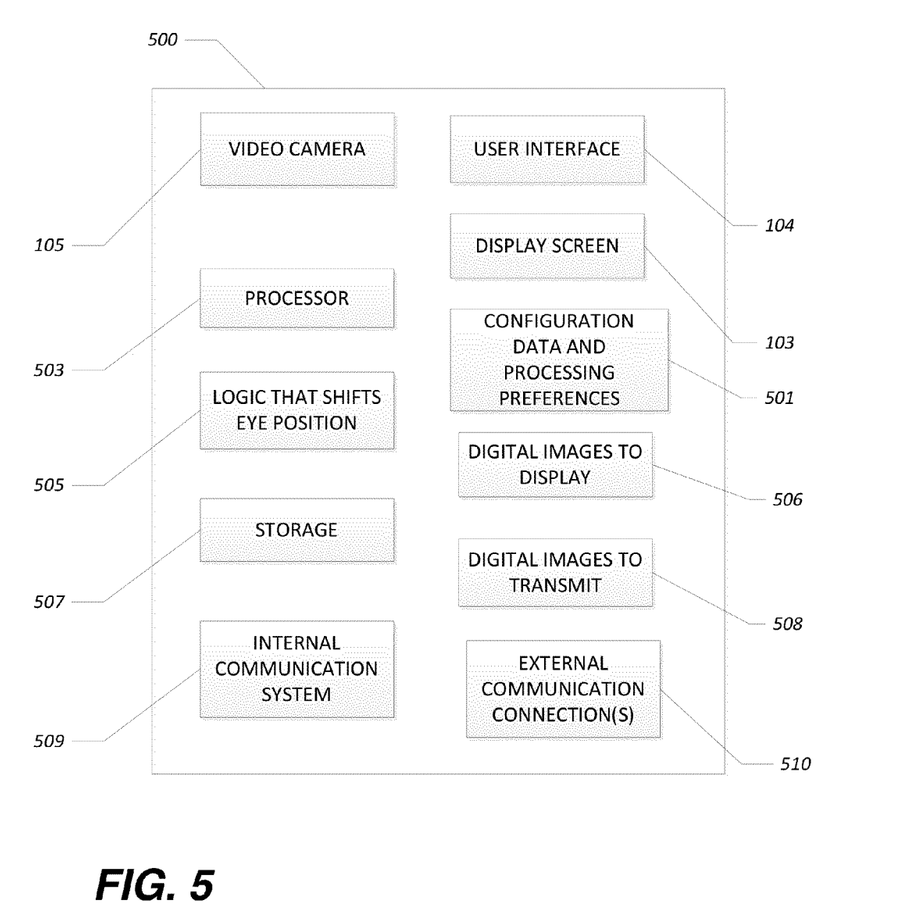
FIG. 5 is a block diagram illustrating an apparatus that corrects gaze direction in a video stream.

FIG. 5 shows structural components of an apparatus or system that executes the process of automated eye-shifting. Some embodiments may not have all of the components that this one has.

A minimal configuration would have logic 505 that automatically shifts eye focal direction to be directed toward a camera, possibly as in the process embodiment of FIG. 4, and one or more digital images, possibly in a stream, or time series, of video images. Typically, that processing will involve a processor 503 that executes logic 505, in the form software instructions and/or hardware. Components of the system may communicate using an internal communication system 509. The logic may access configuration data and processing preferences 501, although such data itself is not necessary for a minimal configuration.

Configuration data might include, for example, the brand/make and model of the transmitting device, and information about the geometry of the video camera 105 and/or screen 103 from which the images are being transmitted. Optical properties of the camera might also be included, as well as information about the device such as processor speed. The logic may take processor speed into account in choosing how sophisticated a method of eye-shifting to employ, or, indeed, whether it can be done at all. The type and speed of the various communications systems involved might also be useful. Configuration data may be collected or determined by logic; it might be provided by a user directly or by a user exercise or experiment; or it might be known in advance, such as when the logic knows the device it is running on, and either knows or can ascertain the properties.

Data processing preferences might, for example, determine or influence the choice of eye-shifting method to use, or constraints on when or whether eye-shifting is being used at all. Configuration data and data processing preferences may be stored in storage 507, and accessed by the processor 503 or logic 505.

The system may include one or more external communication connections 510 for transmitting images, whether or not they have been corrected by eye-shifting. FIG. 5 actually illustrates a typical (and non-minimal) implementation for, say, a tablet PC, smart phone or laptop computer being used in a call using video meeting software such as SKYPE®, such as either VCD 100 shown in FIG. 1. In this case, a transmitting VCD 100 will include external communication connections 510 for wired or wireless transmissions over an external communication system to a receiving VCD 100.

The system receives a set of images 506 of R from the other VCD 100 over the external communication connections 510, and displays them on T's display screen 103. T's video camera 105 captures new images 508, which are processed by the eye-shifting logic. The resulting images 508 are transmitted over the external communication connections 510 to R. A user interface 104 in the VCD 100 can be used to initiate/terminate the logic, to enter configuration data and preferences, and so forth.

Figure 6:
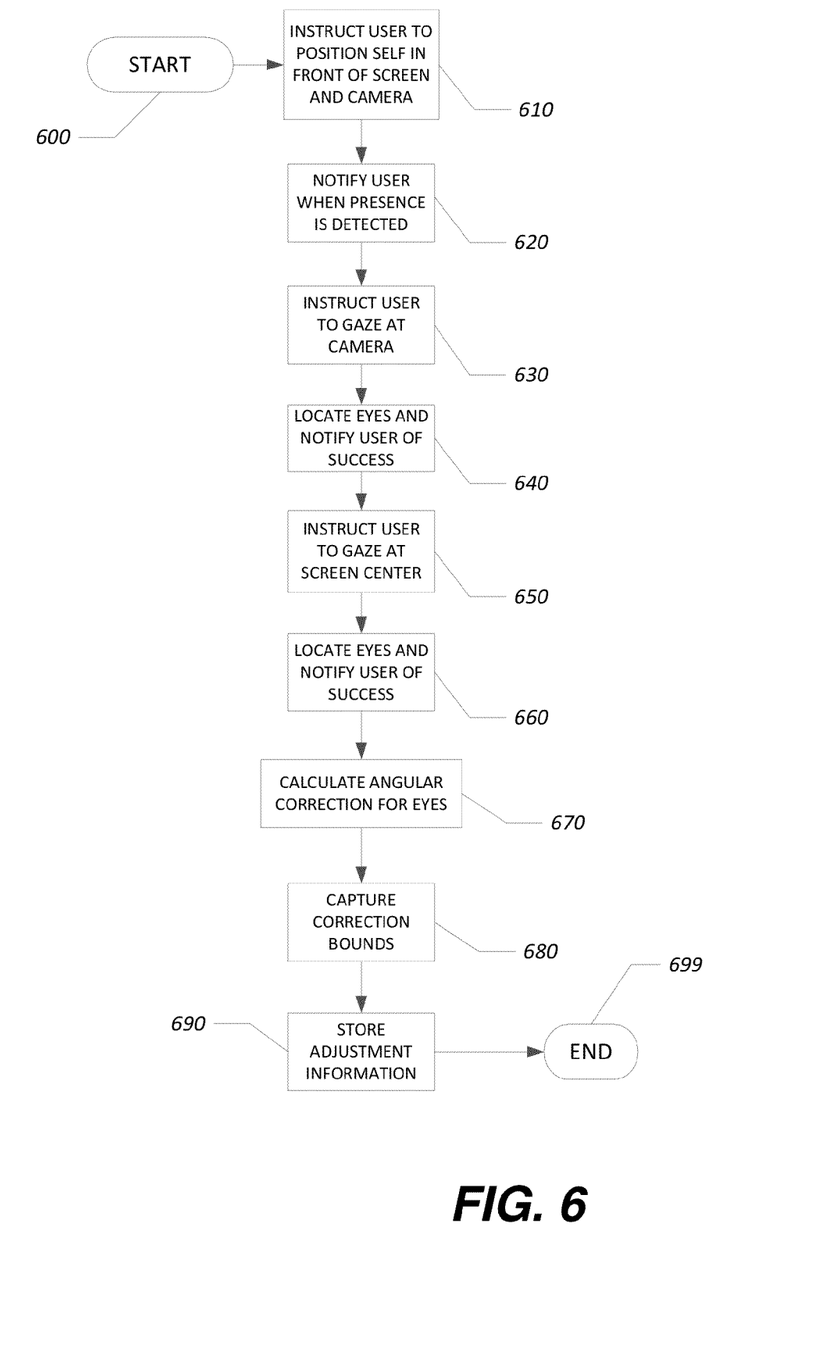
FIG. 6 is a flowchart illustrating a calibration embodiment.

Calibration of the system might be done according to a scheme such as the one illustrated in FIG. 6. At the start 600, video call software, such as SKYPE®, would allow a user to calibrate eye gaze adjustment explicitly, typically through a user interface(UI). For a particular person and portable electronic device 101, such as a tablet PC, the calibration might be done as part of set-up, and the settings stored. Through the UI, the logic instructs 610 the user to position themself in front of the video camera 105 and screen 103. Once the logic detects 620 the user's eyes 200 and their features, it so notifies the user, possibly with an audible tone. The logic instructs 630 the user to stare directly at the video camera 105, and notifies 640 the user upon success. The logic instructs 650 the user to focus on some fixed location on the screen, such as the center. Again, the logic notifies 660 the user when it successfully locates the user's eyes 200 and their features. The logic calculates 670 the angular correction for the eyes. The logic may then determine 680 filter parameters that set bounds on when eye gaze direction correction will be applied at all. For example, the user might be instructed to look at edges of the screen, or just beyond. Gaze sensed during a subsequent video session to be outside the bounds will not be corrected. Again the user may be notified when enough information has been gathered to specify the filter. The logic might give the user the capability to adjust the filter to their personal tastes. Information gathered in the eye correction setup is stored 690 and the process ends 699. Other orderings of the steps are possible, and some might be omitted in particular implementations.

Of course, many variations of the above method are possible within the scope of the invention. The present invention is, therefore, not limited to all the above details, as modifications and variations may be made without departing from the intent or scope of the invention. Consequently, the invention should be limited only by the following claims and equivalent constructions.

What is claimed is:

1. A method, comprising:
    a) communicating through a user interface an instruction that a user should look at a camera that is connected to or built into an electronic device which includes a screen;
    b) determining a first gaze direction of the user when the user is looking at the camera;
    c) communicating through the user interface that the user should look at a point on the screen;
    d) determining a second gaze direction of the user when the user is looking at the point;
    e) calculating an angular difference between the first gaze direction and the second gaze direction.

2. The method of claim 1, wherein the point on the screen is proximate to an eye in an image that is displayed on the screen.

* * * * *